(12) United States Patent
Frederick et al.

(10) Patent No.: US 10,584,277 B2
(45) Date of Patent: Mar. 10, 2020

(54) WATER-IN-OIL EMULSION COMPOSITION AND METHOD OF TREATING SUBTERRANEAN FORMATION USING SAME

(71) Applicant: SOLVAY USA INC., Cranbury, NJ (US)

(72) Inventors: Kevin W Frederick, Evans City, PA (US); Shih-Ruey T Chen, Pittsburgh, PA (US)

(73) Assignee: SOLVAY USA INC., Cranbury, NJ (US)

( * ) Notice: Subject to any disclaimer, the term of this patent is extended or adjusted under 35 U.S.C. 154(b) by 32 days.

(21) Appl. No.: 14/170,970

(22) Filed: Feb. 3, 2014

(65) Prior Publication Data
US 2014/0144643 A1 May 29, 2014

Related U.S. Application Data

(62) Division of application No. 12/032,859, filed on Feb. 18, 2008, now Pat. No. 8,640,774.

(60) Provisional application No. 60/890,221, filed on Feb. 16, 2007.

(51) Int. Cl.
| | |
|---|---|
| *C09K 8/70* | (2006.01) |
| *E21B 43/26* | (2006.01) |
| *C09K 8/36* | (2006.01) |
| *C09K 8/62* | (2006.01) |

(52) U.S. Cl.
CPC ............... *C09K 8/70* (2013.01); *C09K 8/36* (2013.01); *C09K 8/62* (2013.01); *E21B 43/26* (2013.01)

(58) Field of Classification Search
CPC .... C09K 8/36; C09K 8/62; C09K 8/70; E21B 43/26
See application file for complete search history.

(56) References Cited

U.S. PATENT DOCUMENTS

| | | |
|---|---|---|
| 3,067,987 A | 12/1962 | Ballou et al. |
| 3,284,393 A | 11/1966 | Vanderhoff et al. |
| 3,442,803 A | 5/1969 | Hoover et al. |
| 3,562,226 A | 2/1971 | Gayley et al. |
| 3,624,019 A | 11/1971 | Anderson et al. |
| 3,768,565 A | 10/1973 | Persinski et al. |
| 4,024,097 A | 5/1977 | Slovinsky et al. |
| 4,051,065 A | 9/1977 | Venema |
| 4,059,552 A | 11/1977 | Zweigle et al. |
| 4,225,445 A | 9/1980 | Dixon |
| 4,242,247 A | 12/1980 | Pellon et al. |
| 4,252,706 A | 2/1981 | Phillips et al. |
| 4,419,344 A | 12/1983 | Strasilla et al. |
| 4,500,437 A | 2/1985 | Engelhardt et al. |
| 4,522,502 A | 6/1985 | Brazelton |
| 4,525,496 A | 6/1985 | Adaway et al. |
| 4,642,222 A | 2/1987 | Brazelton |
| 4,672,090 A | 6/1987 | Chan |
| 4,694,046 A | 9/1987 | Bock et al. |
| 4,713,431 A | 12/1987 | Bhattacharyya et al. |
| 4,747,691 A | 5/1988 | Hoffland |
| 4,772,659 A | 9/1988 | Chan |
| 4,959,432 A | 9/1990 | Fan et al. |
| 5,065,822 A | 11/1991 | Miller et al. |
| 5,067,508 A * | 11/1991 | Lee .................... F17D 1/17 137/13 |
| 5,292,800 A | 3/1994 | Moench et al. |
| 5,470,150 A | 11/1995 | Pardikes |
| 6,169,058 B1 | 1/2001 | Le et al. |
| 6,454,008 B1 | 9/2002 | Chatterji et al. |
| 6,784,141 B1 | 8/2004 | King et al. |
| 6,825,301 B1 | 11/2004 | Cerf et al. |
| 7,004,254 B1 * | 2/2006 | Chatterji .................. C09K 8/68 166/279 |
| 7,311,146 B1 | 12/2007 | Hanes et al. |
| 8,640,774 B1 | 2/2014 | Frederick et al. |
| 2005/0067194 A1 | 3/2005 | Pena et al. |

* cited by examiner

*Primary Examiner* — Alicia Bland
(74) *Attorney, Agent, or Firm* — Vorys, Sater, Seymour and Pease LLP

(57) ABSTRACT

A method of treating a portion of a subterranean formation that includes: providing a water-in-oil emulsion, inverting the water-in-oil emulsion to form a friction reducing treatment solution, and introducing the treatment solution into the portion of the subterranean formation. The water-in-oil emulsion has an oil phase, an aqueous phase and surfactants. The oil phase (O) and an aqueous phase (A) are present at an O/A ratio of from about 1:8 to about 10:1. The oil phase is present as a continuous phase and contains an inert hydrophobic liquid. The aqueous phase is present as a dispersed phase of distinct particles in the oil phase and includes water and a water soluble polymer. The water soluble polymer makes up from 10 to 25 weight percent of the water-in-oil emulsion. The water-in-oil emulsion is inverted by adding it to water to form a friction reducing treatment solution.

7 Claims, No Drawings

WATER-IN-OIL EMULSION COMPOSITION AND METHOD OF TREATING SUBTERRANEAN FORMATION USING SAME

REFERENCE TO RELATED APPLICATION

This application is a Division of Application. Ser. No. 12/032,859, now U.S. Pat. No. 8,640,774, filed Feb. 18, 2008 and entitled "Method of Treating a Formation," which claims the benefit of priority of U.S. Provisional Application Ser. No. 60/890,221 filed Feb. 16, 2007 entitled "Method of Treating a Formation" which are herein incorporated by reference in their entirety.

BACKGROUND OF THE INVENTION

1. Field of the Invention

The present invention relates to compositions for treating subterranean zones. The compositions include aqueous subterranean treatment fluids that contain water soluble polymers in a water-in-oil emulsion and associated methods.

2. Description of the Prior Art

Aqueous treatment fluids may be used in a variety of subterranean treatments. Such treatments include, but are not limited to, drilling operations, stimulation operations, and completion operations. As used herein, the term "treatment," or "treating," refers to any subterranean operation that uses a fluid in conjunction with a desired function and/or for a desired purpose. The term "treatment," or "treating," does not imply any particular action by the fluid.

Viscous gelled fracturing fluids are commonly utilized in the hydraulic fracturing of subterranean zones penetrated by well bores to increase the production of hydrocarbons from the subterranean zones. That is, a viscous fracturing fluid is pumped through the well bore into a subterranean zone to be stimulated at a rate and pressure such that fractures are formed and extended into the subterranean zone. The fracturing fluid also carries particulate proppant material, e.g., graded sand, into the formed fractures. The proppant material is suspended in the viscous fracturing fluid so that the proppant material is deposited in the fractures when the viscous fracturing fluid is broken and recovered. The proppant material functions to prevent the fractures from closing whereby conductive channels are formed through which produced fluids can flow to the well bore.

An example of a stimulation operation utilizing an aqueous treatment fluid is hydraulic fracturing. In some instances, a fracturing treatment involves pumping a proppant-free, aqueous treatment fluid (known as a pad fluid) into a subterranean formation faster than the fluid can escape into the formation so that the pressure in the formation rises and the formation breaks, creating or enhancing one or more fractures. Enhancing a fracture includes enlarging a pre-existing fracture in the formation. Once the fracture is formed or enhanced, proppant particulates are generally placed into the fracture to form a proppant pack that may prevent the fracture from closing when the hydraulic pressure is released, forming conductive channels through which fluids may flow to the well bore.

During the pumping of the aqueous treatment fluid into the well bore, a considerable amount of energy may be lost due to friction between the aqueous treatment fluid in turbulent flow and the formation and/or tubular goods (e.g., pipes, coiled tubing, etc.) disposed within the well bore. As a result of these energy losses, additional horsepower may be necessary to achieve the desired treatment. To reduce these energy losses, friction reducing polymers have heretofore been included in aqueous treatment fluids. The friction reducing polymer should reduce the frictional losses due to friction between the aqueous treatment fluid in turbulent flow and the tubular goods and/or the formation.

In some instances, the friction reducing polymers that have been used previously are suspended in oil-external emulsions, wherein upon addition to the aqueous treatment fluid, the emulsion should invert releasing the friction reducing polymer into the fluid. One such friction reducing polymer is a copolymer of acrylic acid (in an amount of 30% by weight) and acrylamide (in an amount of 70% by weight). However, it is believed that the ionic nature of certain of these friction reducing polymers (such as the aforementioned copolymer) may cause the friction reducing polymers to function as flocculants. This may be undesirable, for example, in fracturing treatments in that the interaction of the friction reducing polymer with formation fines may result in the coagulation of formation fines into flocs. The resulting flocs may be undesirable, among other things, because the flocs may facilitate the formation of a stable emulsion in the formation possibly undesirably impacting subsequent production from the well bore.

One proposed solution to the aforementioned problems is disclosed in U.S. Pat. No. 7,004,254, which discloses aqueous treatment fluids that contain water, and a friction reducing copolymer that includes 60% to 90% by weight acrylamide and 10% to 20% by weight acrylic acid. The friction reducing copolymer is provided as a water-in-oil emulsion, where the polymer is present in the emulsion at 30% to 35% by weight of the emulsion. The treatment fluid is formed by combining the water-in-oil emulsion with additional water such that the polymer is present in the treatment fluid at from 0.025% to 0.1% by weight.

A particular problem with this approach is the high activity loading of the polymer in the water-in-oil emulsion polymer. Fracturing operations are often run at rates of 50 barrels per minute (BPM) or 35 gallons per second (GPS) and at times as fast as 100 BPM. These fracturing rates can require consumption rates of about 0.025 gallons of water-in-oil emulsion per second. Uniformity of mixing is strongly desired. However, even though good metering pumps are available, it is difficult to add such a low feed rate consistently and accurately and getting it thoroughly mixed. The highly concentrated, compacted and intertwined polymer molecules often have an insufficient opportunity to disperse, separate and expand in the water, which results in less viscosity build and less of a friction reducing effect than would be expected for such polymer.

Additionally, the relatively high polymer usage in subterranean treatment methods can result in significant formation damage. Further, when the treatment fluid is recycled above ground, the high levels of high molecular weight polymers in the fluid can lead to flocculation in above ground fluid recycle operations such as terminal upsets.

There is a need in the art to provide a water-in-oil friction reducing polymer that will allow for rapid make down and improved performance in treatment fluids for subterranean zones, overcoming the above-described problems.

SUMMARY OF THE INVENTION

The present invention provides a method of treating a portion of a subterranean formation that includes: providing a water-in-oil emulsion, inverting the water-in-oil emulsion to form a friction reducing treatment solution, and introducing the treatment solution into the portion of the subterranean formation. The water-in-oil emulsion has an oil phase, an aqueous phase and surfactants. The oil phase (O) and an aqueous phase (A) are present at an O/A ratio of from about 8:1 to about 1:10. The oil phase is present as a continuous phase and contains an inert hydrophobic liquid. The aqueous phase is present as a dispersed phase of distinct particles in the oil phase and includes water and a water soluble polymer. The water soluble polymer makes up from 10 to 25 weight percent of the water-in-oil emulsion. The water-in-oil emulsion is inverted by adding it to water to form a friction reducing treatment solution.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

As used herein, the terms "(meth)acrylic" and "(meth)acrylate" are meant to include both acrylic and methacrylic acid derivatives, such as the corresponding alkyl esters often referred to as acrylates and (meth)acrylates, which the term "(meth)acrylate" is meant to encompass.

As used herein, the term "polymer" is meant to encompass oligomer, and includes, without limitation, both homopolymers and copolymers.

As used herein, the term "copolymer," as used herein, is not limited to polymers containing two types of monomeric units, but includes any combination of polymers, e.g., terpolymers, tetrapolymers, and the like.

The present invention provides a method of treating a portion of a subterranean formation that includes: providing a water-in-oil emulsion, inverting the water-in-oil emulsion to provide an aqueous treatment fluid that includes a polymer solution, and introducing the aqueous treatment fluid into the portion of the subterranean formation.

The aqueous treatment fluids of the present invention generally include water, and a friction reducing copolymer.

The water-in-oil emulsion includes an oil phase, an aqueous phase and surfactants.

The oil phase (O) and the aqueous phase (A) can be present at an O/A ratio, based on the volume of each phase of from al least about 1:8, in some cases at least about 1:6 and in other cases at least about 1:4 and can be up to about 10:1, in some cases up to about 8:1 and in other cases up to about 6:1. When the O/A ratio is too oil heavy, the polymer may be too concentrated in the aqueous phase. When the O/A ratio is too water heavy, the emulsion may become unstable and prone to separate. The O/A ratio can be any ratio or range between any of the ratios recited above.

In the present water-in-oil emulsion, the oil phase is present as a continuous phase and includes an inert hydrophobic liquid. The inert hydrophobic liquid can include, as non-limiting examples, paraffinic hydrocarbons, napthenic hydrocarbons, aromatic hydrocarbons, benzene, xylene, toluene, mineral oils, kerosenes, naphthas, petrolatums, branch-chain isoparaffinic solvents, branch-chain hydrocarbons, saturated, linear, and/or branched paraffin hydrocarbons and combinations thereof. Particular non-limiting examples include natural, modified or synthetic oils such as the branch-chain isoparaffinic solvent available as ISOPAR® M and EXXATE® available from ExxonMobile Corporation, Irving Tex., a narrow fraction of a branch-chain hydrocarbon available as KENSOL® 61 from Witco Chemical Company, New York, N.Y., mineral oil, available commercially as BLANDOL® from Witco, CALUMET™ LVP-100 available from Calumet Specialty Products, Burnham, Ill., DRAKEOL® from Penreco Partnership, Houston, Tex., MAGIESOL® from Magie Bros., Oil City, Pa. and vegetable oils such as canola oil, coconut oil, rapeseed oil and the like.

The inert hydrophobic liquid is present in the water-in-oil emulsion in an amount sufficient to form a stable emulsion. In some embodiments, the inert hydrophobic liquid can be present in the water-in-oil emulsions in an amount in the range of from about 15% to about 80% by weight.

In embodiments of the invention, the inert hydrophobic liquid is present in the water-in-oil emulsion at a level of at least about 15, in some cases at least about 17.5, and in other cases at least about 20 weight percent based on the weight of the water-in-oil emulsion and can be present at up to about 80, in some cases up to about 60, in other cases up to about 40 and in some instances up to about 30 weight percent based on the weight of the water-in-oil emulsion. The total amount of inert hydrophobic liquid in the water-in-oil emulsion can be any value or can range between any of the values recited above.

Any suitable water-in-oil emulsifier can be used as the one or more surfactants used to make the water soluble polymer containing water-in-oil emulsion used in the present method. In embodiments of the invention, the surfactants include those having an HLB (hydrophilic-lipophilic balance) value between 2 and 10 in some cases between 3 and 9 and in other cases between 3 and 7.

As used herein, HLB is calculated using the art known method of calculating a value based on the chemical groups of the molecule. The method uses the following equation:

$$HLB = 7 + m*Hh + n*Hl$$

where m represents the number of hydrophilic groups in the molecule, Hh represents the value of the hydrophilic groups, n represents the number of lipophilic groups in the molecule and Hl represents the value of the lipophilic groups.

Non-limiting examples of suitable surfactants include:
fatty acid esters of mono-, di- and polyglycerols, for instance the monoleate, the dioleate, the monostearate, the distearate and the palmitostearate. These esters can be prepared, for example, by esterifying mono-, di- and polyglycerols, or mixtures of polyhydroxylated alcohols such as ethylene glycol, diethylene glycol, dipropylene glycol, 1,4-butanediol, 1,2,4-butanetriol, glycerol, trimethylolpropane, sorbitol, neopentyl glycol and pentaerythritol;
fatty acid esters of sorbitan, for instance sorbitan monoleate, sorbitan dioleate, sorbitan trioleate, sorbitan monostearate and sorbitan tristearate;
fatty acid esters of mannitol, for instance mannitol monolaurate or mannitol monopalmitate;
fatty acid esters of pentaerythritol, for instance pentaerythritol monomyristate, pentaerythritol monopalmitate and pentaerythritol dipalmitate;
fatty acid esters of polyethylene glycol sorbitan, more particularly the monooleates;
fatty acid esters of polyethylene glycol mannitol, more particularly the monooleates and trioleates;
fatty acid esters of glucose, for instance glucose monooleate and glucose monostearate;
trimethylolpropane distearate;
the products of reaction of isopropylamide with oleic acid;
fatty acid esters of glycerol sorbitan;
ethoxylated alkylaines;
sodium hexadecyl phthalate;
sodium decyl phthalate; and
oil-soluble alkanolamides.

In particular embodiments of the invention, the surfactants can include ethoxylated nonionic surfactants, guerbet alcohol ethoxylate, and mixtures thereof. Specific examples include, but are not limited to tall oil fatty acid diethanolamine, such as those available as AMADOL® 511, from Akzo Nobel Surface Chemistry, Chicago, Ill.; polyoxyethylene (5) sorbitan monoleate, available as TWEEN® 81, from Uniqema, New Castle, Del.; sorbinate monoleate, available as SPAN® 80 from Uniquena, and ALKAMULS® SMO, from Rhone Poulenc, Inc., Paris, France.

The surfactants can be present at a level of at least about 0.1, in some instances at least about 0.25, in other instances at least about 0.5, in some cases at least about 0.75 and in other cases at least about 1 weight percent of the water-in-oil emulsion. When the amount of surfactants is too low, the aqueous phase may not be adequately dispersed in the oil phase and/or the water-in-oil emulsion may tend to separate into oil and aqueous phases. Also, the amount of surfactants can be up to about 7, in some cases up to about 5, and in other cases up to about 2.5 weight percent of the water-in-oil emulsion. The amount of surfactants in the water-in-oil emulsion can be any value or can range between any of the values recited above.

The aqueous phase is a dispersed phase of distinct particles in the oil phase and includes water and a water soluble polymer. The aqueous phase in total can be present in the present water-in-oil emulsion polymer composition at a level of at least about 65, in some cases at least about 67.5, and in other cases at least about 70 weight percent based on the weight of the water-in-oil emulsion and can be present at up to about 85, in some cases up to about 82.5, in other cases up to about 80 and in some instances up to about 77.5 weight percent based on the weight of the water-in-oil emulsion. The total amount of aqueous phase in the water-in-oil emulsion can be any value or can range between any of the values recited above.

In the present invention, the water soluble polymer is present at a level of at least about 10, in some cases at least about 12.5, and in other cases at least about 15 weight percent based on the weight of the water-in-oil emulsion and can be present at up to about 25, in some cases up to about 22, in other cases up to about 21 and in some instances up to about 20 weight percent based on the weight of the water-in-oil emulsion. When the amount of water soluble polymer is too low, the use of the water-in-oil emulsion in the present method of treating a portion of a subterranean formation may be uneconomical. When the amount of water soluble polymer is too high, the performance of the water soluble polymer in the present method of treating a portion of a subterranean formation may be less than optimum. The amount of water soluble polymer in the aqueous phase of the water-in-oil emulsion can be any value or can range between any of the values recited above.

In some embodiments of the invention, the water soluble polymer can be present at a level of at least about 10, in some cases at least about 15, and in other cases at least about 20 weight percent based on the weight of the water-in-oil emulsion and can be present at up to about 35 and in some cases up to about 30 weight percent based on the weight of the water-in-oil emulsion. In these embodiments, the amount of water soluble polymer in the aqueous treatment fluid is typically less than about 0.01%, based on the weight of the aqueous treatment fluid.

Not being limited to any single theory, it is believed that the water-in-oil emulsion used in the present method is able to release the water soluble polymer from the water-in-oil emulsion into the aqueous treatment fluid more effectively and more efficiently than prior art methods. Prior art methods typically require using a water-in-oil emulsion containing a water soluble polymer at levels of 30 weight percent or more. These water soluble polymers are very high molecular weight and the individual polymer molecules are highly entangled and intertwined and do not easily disentangle and or separate from each other when added to make up water. This problem is overcome in the present invention, as the lower amount of water soluble polymers in the dispersed aqueous phase particles of the present water-in-oil emulsion provide for less entangling and intertwining of the individual polymer molecules and more rapid make dissolution, and therefore viscosity build during make down to form the aqueous treatment fluid. The resulting improved make down of the individual polymer molecules provides a more efficient and effective friction reducing treatment solution by allowing the polymer molecules to more readily disperse, separate and expand in water, which results in more viscosity build and more of a friction reducing effect.

The water-in-oil emulsion of the present invention can be made down into a 2 wt % aqueous solution of the inverted water-in-oil emulsion. The bulk viscosity of the solution can be measured at 25° C. using a Brookfield RV instrument equipped with an appropriate spindle at 10 rpm at 25° C. (Brookfield Engineering Laboratories, Inc., Middleboro, Mass.).

Thus, the water soluble polymers in the dispersed aqueous phase particles of the present water-in-oil emulsion are able to provide a greater friction reducing effect by reducing the energy losses due to friction in the aqueous treatment fluids of the present invention. As a non-limiting example, the water soluble polymers of the present invention can reduce energy losses during introduction of the aqueous treatment fluid into a well bore due to friction between the aqueous treatment fluid in turbulent flow and the formation and/or tubular good(s) (e.g., a pipe, coiled tubing, etc.) disposed in the well bore.

The water-in-oil emulsion containing the water soluble polymer of the present method is prepared using water-in-oil emulsion polymerization techniques. Suitable methods to effect such polymerizations are known in the art, non-limiting examples of such being disclosed in U.S. Pat. Nos. 3,284,393; 4,024,097; 4,059,552; 4,419,344; 4,713,431; 4,772,659; 4,672,090; 5,292,800; and 6,825,301, the relevant disclosures of which are incorporated herein by reference.

Typically, the water-in-oil polymerization is carried out by mixing the surfactants with the oil phase, which contains the inert hydrophobic liquid. The aqueous phase is then prepared combining a monomer mixture with water in the desired concentration. Additionally, a chelant, such as a sodium salt of EDTA can optionally be added to the aqueous phase and the pH of the aqueous phase can be adjusted to 3.0 to 10.0, depending on the particular monomer(s) in the monomer mixture. The aqueous phase is then added to the mixture of oil phase and surfactants. The surfactants enable the aqueous phase, which contains the monomer mixture, to be emulsified into and form discrete particles in the oil phase. Polymerization is then carried out in the presence of a free radical generating initiator.

Any suitable initiator can be used. Non-limiting examples of suitable initiators include diethyl 2,2'-azobisisobutyrate, dimethyl 2,2'-azobisisobutyrate, 2-methyl 2'-ethyl azobisisobutyrate, benzoyl peroxide, lauroyl peroxide, sodium persulfate, potassium persulfate, tert-butyl hydroperoxide, dimethane sulfonyl peroxide, ammonium persulfate, azobisisobutylronitrile, dimethyl 2,2'-azobis (isobutyrate) and combinations thereof.

The amount of initiator can be from about 0.01 to 1% by weight of the monomer mixture, in some cases from 0.02% to 0.5% by weight of the monomer mixture.

In some embodiments of the invention, the polymerization technique may have an initiation temperature of about 25° C. and proceed approximately adiabatically. In other embodiments of the invention, the polymerization can be carried out isothermally at a temperature of about from 37° C. to about 50° C.

The monomer mixture typically includes (meth)acrylamide. The amount of (meth)acrylamide can be at least about 50, in some cases at least about 60, and in other cases at least about 70 weight percent based on the weight of the monomer mixture. When the amount of (meth)acrylamide is too low, the molecular weight of the resulting water soluble polymer may be lower than desired. Also, the amount of (meth)acrylamide in the monomer mixture can be up to about 90, in some case up to about 85, and in other cases up to about 80 weight percent based on the weight of the monomer mixture. When the amount of (meth)acrylamide is too high, the water soluble polymer may not carry enough ionic charge to optimally function as a friction reducing polymer. The amount of (meth)acrylamide in the monomer mixture can be any value or range between any of the values recited above.

The monomer mixture typically includes (meth)acrylic acid and/or its corresponding salts, non-limiting examples being sodium, potassium and ammonium. The amount of (meth)acrylic acid can be at least about 10, in some cases at least about 12, and in other cases at least about 14 weight percent based on the weight of the monomer mixture. When the amount of (meth)acrylic acid is too low, the water soluble polymer may not carry enough ionic charge to optimally function as a friction reducing polymer. Also, the amount of (meth)acrylic acid in the monomer mixture can be up to about 40, in some case up to about 18, and in other cases up to about 16 weight percent based on the weight of the monomer mixture. When the amount of (meth)acrylic acid is too high, the water soluble polymer may have undesirable flocculation properties when used in the present method. The amount of (meth)acrylic acid in the monomer mixture can be any value or range between any of the values recited above.

Optionally, the water soluble polymer can include other monomers to provide desirable properties to the polymer. Non-limiting examples of suitable other monomers that can be included in the monomer mixture, and ultimately the resulting water soluble polymer include 2-(meth)acrylamido-2-methylpropane sulfonic acid (AMPSA), N,N-dimethyl (meth)acrylamide (DMF), vinyl sulfonic acid (NSA), N-vinyl acetamide, N-vinyl formamide, acrylonitrile (including hydrolyzed products of acrylonitrile residues), acrylonitrile-dimethyl amine reaction products, and/or corresponding salts, non-limiting examples being sodium, potassium and/or ammonium and mixtures thereof.

In certain embodiments of the invention, polymerized residues of AMPSA can be present in the monomer mixture of the present invention in an amount in the range of from about 0.1% to about 30%, in some cases about 0.5% to about 20%, and in other cases from about 1% to about 10% by weight of the monomer mixture. In a particular embodiment of the invention, the monomer mixture includes acrylamide in an amount in the range of from about 70% to about 85% by weight, acrylic acid in an amount in the range of from about 10% to about 12.5% by weight, and 2-acrylamido-2-methylpropane sulfonic acid in an amount in the range of from about 2.5% to about 20% by weight of the monomer mixture.

In some embodiments of the invention, DMF can be present in the monomer mixture in an amount in the range of from about 0.1% to about 30%, in some cases about 0.5% to about 20%, and in other cases from about 1% to about 10% by weight of the monomer mixture. In a particular embodiment of the invention, the monomer mixture includes acrylamide in an amount in the range of from about 60% to about 80% by weight, acrylic acid in an amount in the range of from about 10% to about 12.5% by weight, 2-acrylamido-2-methylpropane sulfonic acid in an amount in the range of from about 7.5% to about 20% by weight, and N,N-dimethylacrylamide in an amount in the range of from about 2.5% to about 10% by weight of the monomer mixture.

In other embodiments of the invention, vinyl sulfonic acid can be present in the monomer mixture in an amount in the range of from about 0.1% to about 30%, in some cases about 0.5% to about 20%, and in other cases from about 1% to about 10% by weight of the monomer mixture. In a particular embodiment of the invention, the monomer mixture includes acrylamide in an amount in the range of from about 60% to about 85% by weight, acrylic acid in an amount in the range of from about 10% to about 20% by weight, 2-acrylamido-2-methylpropane sulfonic acid in an amount in the range of from about 0.1% to about 25% by weight, and vinyl sulfonic acid in an amount in the range of from about 0.1% to about 5% by weight of the monomer mixture.

In further embodiments of the invention, N-vinyl acetamide can be present in the monomer mixture in an amount in the range of from about 0.1% to about 30%, in some cases about 0.5% to about 20%, and in other cases from about 1% to about 10% by weight of the monomer mixture. In a particular embodiment of the invention, the monomer mixture includes acrylamide in an amount in the range of from about 60% to about 85% by weight, acrylic acid in an amount in the range of from about 10% to about 20% by weight, 2-acrylamido-2-methylpropane sulfonic acid in an amount in the range of from about 0.1% to about 25% by weight, and N-vinyl acetamide in an amount in the range of from about 0.1% to about 5% by weight of the monomer mixture.

In additional embodiments of the invention, N-vinyl formamide can be present in the monomer mixture in an amount in the range of from about 0.1% to about 30%, in some cases about 0.5% to about 20%, and in other cases from about 1% to about 10% by weight of the monomer mixture. In a particular embodiment of the invention, the monomer mixture includes acrylamide in an amount in the range of from about 60% to about 85% by weight, acrylic acid in an amount in the range of from about 10% to about 20% by weight, 2-acrylamido-2-methylpropane sulfonic acid in an amount in the range of from about 0.1% to about 25% by weight, and N-vinyl formamide in an amount in the range of from about 0.1% to about 5% by weight of the monomer mixture.

Typically, the composition of the water soluble polymer will be the same or about the same as the composition of the monomer mixture.

In some embodiments, the oil-in-water emulsion can include a salt. Among other things, the salt can be present to add stability to the emulsion and/or reduced viscosity of the emulsion. Examples of suitable salts, include, but are not limited to, ammonium chloride, potassium chloride, sodium chloride, ammonium sulfate, and mixtures thereof. In some embodiments, the salt can be present in emulsions in an amount in the range of from about 0.5% to about 2.5% by weight of the emulsion.

In some embodiments, the oil-in-water emulsions can include an inhibitor. Among other things, the inhibitor can be included to prevent premature polymerization of the monomers prior to initiation of the emulsion polymerization reaction. As those of ordinary skill in the art will appreciate, with the benefit of this disclosure, the water soluble polymer may have been synthesized using an emulsion polymerization technique wherein the inhibitor acted to prevent premature polymerization. Examples of suitable inhibitors include, but are not limited to, quinones. An example of a suitable inhibitor comprises a 4-methoxyphenol (MEHQ). The inhibitor should be present in an amount sufficient to provide the desired prevention of premature polymerization. In some embodiments, the inhibitor may be present in an amount in the range of from about 0.001% to about 0.1% by weight of the emulsion.

The water soluble polymers of the present invention typically have a molecular weight sufficient to provide a desired level of friction reduction. Generally, friction reducing polymers have a higher molecular weight in order to provide a desirable level of friction reduction. As a non-limiting example, the weight average molecular weight of the friction reducing copolymers may be in the range of from about 7,500,000 to about 20,000,000, as determined using intrinsic viscosities. Those of ordinary skill in the art will recognize that friction reducing copolymers having molecular weights outside the listed range may still provide some degree of friction reduction in an aqueous treatment fluid.

As used herein, intrinsic viscosity is determined using a Ubbelhhde Capillary Viscometer and solutions of the water soluble polymer in 1M NaCl solution, at 30° C., and pH 7 at 0.05 wt. %, 0.025 wt. % and 0.01 wt. % and extrapolating the measured values to zero concentration to determine the intrinsic viscosity. The molecular weight of the water soluble polymer is then determined using the Mark-Houwink equation as is known in the art.

Alternatively, the reduced viscosity of the water soluble polymer at 0.05 wt. % concentration is used to measure molecular size. As such, the water soluble polymer has a reduced viscosity, as determined in an Ubbelohde Capillary Viscometer at 0.05% by weight concentration of the polymer in 1M NaCl solution, at 30° C., pH 7, of from about 10 to about 40 dl/g, in some cases from 15 to about 35 dl/g, and in other cases 15 to about 30 dl/g.

Suitable water soluble polymers of the present invention can be in an acid form or in a salt form. A variety of salts can be made by neutralizing the acid form of the acrylic acid monomer and/or the AMPSA monomer with a base, such as sodium hydroxide, potassium hydroxide, ammonium hydroxide or the like. As used herein, the term "water soluble polymer" is intended to include both the acid form of the friction reducing copolymer and its various salts.

The water-in-oil emulsion is added to water by inverting the emulsion to form a friction reducing treatment solution. As used herein, the terms "invert" and/or "inverting" refer to exposing the water-in-oil emulsion to conditions that cause the aqueous phase to become the continuous phase. This inversion releases the water soluble polymer into the make up water.

Methods of inverting water soluble polymer containing water-in-oil emulsions are known in the art and are disclosed, as a non-limiting example in U.S. Pat. No. 3,624,019.

In embodiments of the invention, in order to aid the inversion, make down and dissolution of the water soluble polymer, an inverting surfactant can be included in the water-in-oil emulsion. Among other things, the inverting surfactant can facilitate the inverting of the emulsion upon addition to make up water and/or the aqueous treatment fluids of the present invention. As those of ordinary skill in the art will appreciate, with the benefit of this disclosure, upon addition to the aqueous treatment fluid, the water-in-oil emulsion should invert, releasing the copolymer into the aqueous treatment fluid.

Non-limiting examples of suitable inverting surfactants include, polyoxyethylene alkyl phenol; polyoxyethylene (10 mole) cetyl ether; polyoxyethylene alkyl-aryl ether; quaternary ammonium derivatives; potassium oleate; N-cetyl-N-ethyl morpholinium ethosulfate; sodium lauryl sulfate; condensation products of higher fatty alcohols with ethylene oxide, such as the reaction product of oleyl alcohol with 10 ethylene oxide units; condensation products of alkylphenols and ethylene oxide, such as the reaction products of isooctylphenol with 12 ethylene oxide units; condensation products of higher fatty acid amines with five, or more, ethylene oxide units; ethylene oxide condensation products of polyhydric alcohol partial higher fatty esters, and their inner anhydrides (e.g., mannitol anhydride, and sorbitol-anhydride).

In particular embodiments of the invention, the inverting surfactants can include ethoxylated nonyl phenols, ethoxylated nonyl phenol formaldehyde resins, ethoxylated alcohols, nonionic surfactants with an HLB of from 12 to 14, and mixtures thereof.

A specific non-limiting example of a suitable inverting surfactant includes an ethoxylated $C_{12}$ $C_{16}$ alcohol. The inverting surfactant can be present in an amount sufficient to provide the desired inversion of the emulsion upon contact with the water in the aqueous treatment fluid. In some embodiments, the inverting surfactant can be present in an amount in the range of from about 1% to about 5%, in some cases from about 1.5% to about 3.5% by weight of the water-in-oil emulsion.

In many embodiments of the invention, the inverting surfactants are added to the water-in-oil emulsion after the polymerization is completed.

In some embodiments of the invention, a batch method can be used to make down the water-in-oil emulsion. In this embodiment, the water soluble polymer containing water-in-oil emulsion and water are delivered to a common mixing tank. Once in the tank, the solution is beat or mixed for a specific length of time in order to impart energy thereto. After mixing, the resulting solution must age to allow enough time for the molecules to unwind. This period of time is significantly reduced in the present invention.

In other embodiments of the invention, continuous in-line mixers as well as in-line static mixers can be used to combine the water soluble polymer containing water-in-oil emulsion and water. Non-limiting examples of suitable mixers utilized for mixing and feeding are disclosed in U.S. Pat. Nos. 4,522,502; 4,642,222; 4,747,691; and 5,470,150. Non-limiting examples of suitable static mixers can be found in U.S. Pat. Nos. 4,051,065 and 3,067,987.

Once the water soluble polymer containing water-in-oil emulsion is made down into water, any other additives are added to the solution to form a treatment solution, which is then introduced into the portion of the subterranean formation.

Generally, the water soluble polymer of the present invention can be included in any aqueous treatment fluid used in subterranean treatments to reduce friction. Such subterranean treatments include, but are not limited to, drilling operations, stimulation treatments (e.g., fracturing treatments, acidizing treatments, fracture acidizing treatments), and completion operations. Those of ordinary skill in the art, with the benefit of this disclosure, will be able to recognize a suitable subterranean treatment where friction reduction may be desired.

The water used in the aqueous treatment fluids of the present invention can be freshwater, saltwater (e.g., water containing one or more salts dissolved therein), brine (e.g., produced from subterranean formations), seawater, pit water, pond water—or—the like, or combinations thereof. Generally, the water used may be from any source, provided that it does not contain an excess of compounds that may adversely affect other components in the aqueous treatment fluid or the formation itself. The present invention is effective in all aqueous treating fluid waters.

The water soluble polymers of the present invention should be included in the aqueous treatment fluids of the present invention in an amount sufficient to provide the desired reduction of friction. In some embodiments, a water soluble polymer of the present invention may be present in an amount that is at least about 0.0025%, in some cases at least about 0.003%, in other cases at least about 0.0035% and in some instances at least about 0.05% by weight of the aqueous treatment fluid and can be up to about 4%, in some cases up to about 3%, in other cases up to about 2%, in some instances up to about 1%, in other instances up to about 0.02%, in some situations up to less than about 0.1%, in other situations, up to about 0.09%, and in specific situations, up to about 0.08% by weight of the aqueous treatment fluid. The amount of the water soluble polymers included in the aqueous treatment fluids can be any value or range between any of the values recited above.

In some embodiments, the water soluble polymer of the present invention can be present in aqueous treatment fluids in an amount in the range of from about 0.0025% to about 0.025%, in some cases in the range of from about 0.0025% to less than about 0.01%, in other cases in the range of from about 0.0025% to about 0.009%, and in some situations in the range of from about 0.0025% to about 0.008%, by weight of the aqueous treatment fluid.

In embodiments of the invention, when the present water-in-oil emulsions are used, the amount of water soluble polymer in the aqueous treatment fluid can be at least about 5%, in some cases at least about 7.5%, in other cases at least about 10%, in some instances at least about 12.5%, in other instances at least about 15%, in some situations at least about 20%, and in other situations at least about 25% less than when water-in-oil emulsion containing a polymer of the same composition at a concentration of 30 weight percent or more are used in the in the aqueous treatment fluid.

In embodiments of the invention, the water-in-oil emulsions according to the invention are used in the friction reducing treatment solution in an amount of at least about 0.1 gallons of water-in-oil emulsion per thousand gallons of aqueous treating fluid water (gpt), in some cases at least about 0.15 gpt, and in other cases at least about 0.2 gpt and can be up to about 2 gpt, in some cases up to about 1.75 gpt, in other cases up to about 1.5 gpt, in some instances up to about 1.25 gpt, and in other instances up to about 1.1 gpt. The amount of water-in-oil emulsion used in the friction reducing treatment solution can be any value or range between any of the values recited above.

The lower polymer usage when the present invention is used results in significantly decreased formation damage, decreased flocculation in above ground fluid recycle operations, and is more environmentally friendly as lower levels of polymer are used. Additionally, the lower polymer dose can be delivered using existing equipment resulting in better performance with little or no capital cost requirement.

Additional additives can be included in the aqueous treatment fluids of the present invention as deemed appropriate by one of ordinary skill in the art, with the benefit of this disclosure. Examples of such additives include, but are not limited to, corrosion inhibitors, proppant particulates, acids, fluid loss control additives, and surfactants. For example, an acid may be included in the aqueous treatment fluids, among other things, for a matrix or fracture acidizing treatment. In fracturing embodiments, proppant particulates may be included in the aqueous treatment fluids to prevent the fracture from closing when the hydraulic pressure is released.

The aqueous treatment fluids of the present invention can be used in any subterranean treatment where the reduction of friction is desired. Such subterranean treatments include, but are not limited to, drilling operations, stimulation treatments (e.g., fracturing treatments, acidizing treatments, fracture acidizing treatments), and completion operations. Those of ordinary skill in the art, with the benefit of this disclosure, will be able to recognize a suitable subterranean treatment where friction reduction may be desired.

In some embodiments, the present invention provides a method of treating a portion of a subterranean formation that includes providing the above-described aqueous treatment fluid and introducing the aqueous treatment fluid into the portion of the subterranean formation. In some embodiments, the aqueous treatment fluid can be introduced into the portion of the subterranean formation at a rate and pressure sufficient to create or enhance one or more fractures in the portion of the subterranean formation. The portion of the subterranean formation that the aqueous treatment fluid is introduced will vary dependent upon the particular subterranean treatment. For example, the portion of the subterranean formation may be a section of a well bore, for example, in a well bore cleanup operation. In the stimulation embodiments, the portion may be the portion of the subterranean formation to be stimulated.

The methods of the present invention can also include preparing the aqueous treatment fluid. Preparing the aqueous treatment fluid can include providing the water soluble polymer containing water-in-oil emulsion and combining the water soluble polymer with the water to from the aqueous treatment fluid.

The present invention will further be described by reference to the following examples. The following examples are merely illustrative of the invention and are not intended to be limiting. Unless otherwise indicated, all percentages are by weight.

Example 1

Preparation of Water-in-Oil Emulsion Polymers

The ingredients in the aqueous monomer phase, oil phase and surfactants (expressed as weight percentage of the total water-in-oil emulsion composition) used are shown in the table below. Preparation typically included combining softened water, acrylamide, acrylic acid, EDTA and 25% sodium hydroxide and stirring until uniform to form the aqueous phase. The oil phase was made by combining a hydrophobic liquid with the indicated surfactants with mixing. The aqueous phase was added to the oil phase with mixing to form a dispersion of the aqueous phase dispersed in the continuous oil phase. The dispersion was heated to an initiation temperature while sparging with nitrogen and an oil soluble free radical initiator was added to the dispersion to initiate polymerization. Typically, the oil phase was added to a glass resin kettle and once agitation was begun, the aqueous phase was added to the resin kettle. The resulting dispersion was sparged with nitrogen for 30 minutes while the temperature was equilibrated to 25° C., at which time 37 microliters of peroxide was added to the stirring dispersion and 0.075% sodium metabisulfite (SMBS) solution was fed to the dispersion at a rate of 0.1 milliliters per minute. The polymerization temperature was controlled between 38° and 42° C. for approximately 90 minutes. Residual monomers were scavenged by feeding 25% sodium metabisulfite (SMBS) solution at a rate of 1.0 milliliters per minute. An inverting surfactant was blended into the water-in-oil polymer emulsion to aid in make-down on use and the dispersion was subsequently cooled to room temperature. The resulting water-in-oil emulsion polymer, had a reduced viscosity measured at 0.05 dl/g in 1N NaCl at 30° C. as indicated in the table. Emulsions A, B, and C were all prepared having a weight ratio of 77% acrylamide and 23% acrylic acid.

|  | Emulsion A (prior art) | Emulsion B | Emulsion C |
|---|---|---|---|
| Active Polymer Aqueous Phase | 30% | 20% | 15% |
| 50 wt % acrylamide solution | 49.03% | 29.09% | 21.58% |
| Acrylic acid | 4.38% | 4.35% | 3.22% |
| 25% NaOH (to pH 6.5) | 9.29% | 9.43% | 6.87% |
| Softened water | 10.18% | 33.77% | 42.89% |
| EDTA | 0.02% | 0.02% | 0.02% |

-continued

|  | Emulsion A (prior art) | Emulsion B | Emulsion C |
|---|---|---|---|
| Oil Phase |  |  |  |
| Aliphatic Hydrocarbon | 20.0% | 16.8% | 18.0% |
| Primary Surfactants: |  |  |  |
| ethoxylated amine | 1.12% | 1.13% | 1.13% |
| sorbitan monooleate | 0.15% | 0.08% | 0.08% |
| polyoxyalkylene sorbitan monooleate | 0.22% | 0.30% | 0.30% |
| Initiator |  |  |  |
| SMBS solution(0.05%) | 0.97% | 1.01% | 1.01% |
| Peroxide | 0.002% | 0.002% | 0.002% |
| Inverting Surfactant: |  |  |  |
| Ethoxylated alcohol | 1.14% | 1.01% | 1.01% |
| $\eta_{red}$ 0.05 dl/g in 1N NaCl @ 30° C. | 26.2 dl/g | 33.4 dl/g | 21.5 dl/g |

Friction Flow Loop Testing

A friction flow loop was constructed from 5/16" inner diameter stainless steel tubing, approximately 30 feet in overall length. Test solutions were pumped out of the bottom of a tapered 5 gallon reservoir. The solution flowed through the tubing and was returned back into the reservoir. The flow is achieved using a plunger pump equipped with a variable speed drive. Pressure is measured from two inline gages, with the last gage located approximately 2 ft from the discharge back into reservoir.

Four gallons of 2% KCl is prepared in the sample reservoir and the pump is started and set to deliver a flow rate of 5-10 gal/min. The salt solution is recirculated until the temperature equilibrates at 25° C. and a stabilized pressure differential is achieved. This pressure is recorded as the "initial pressure" of the 2% KCl solution. The test amount of neat water-in-oil emulsion polymer is quickly injected with a syringe into the sample reservoir containing the 2% KCl and a timer is started. The dose is recorded as gallons of water-in-oil emulsion per thousand gallons of 2% KCl solution (gpt). The pressure is recorded at 30 seconds, 1 min, 2 min and 3 min respectively. The pressure drop is calculated at each time interval comparing it to the initial pressure differential reading of the 2% KCl solution. The percentage friction reduction was determined as described in U.S. Pat. No. 7,004,254. at col. 9, line 36 to col. 10, line 43. The results are shown in the table below, dose is the amount of water-in-oil emulsion used as gallons per thousand gallons and the active dose the amount of polymer used as weight percent of the KCl treatment solution.

| Run No. | Emulsion Sample | Dose (gpt) | Active Dose (wt. %) | 30 sec. | 1 min. | 2 min. | 3 min. |
|---|---|---|---|---|---|---|---|
| 1 | A | 0.25 | 0.0076 | 60 | 75 | 75 | 77.5 |
| 2 | B | 0.25 | 0.0051 | 67.5 | 67.5 | 67.5 | 67.5 |
| 3 | C | 0.25 | 0.0038 | 50 | 50 | 45 | 40 |
| 4 | A | 0.5 | 0.015 | 82.5 | 82.5 | 80 | 77.5 |
| 5 | B | 0.5 | 0.011 | 80 | 80 | 80 | 80 |
| 6 | C | 0.5 | 0.0076 | 75 | 75 | 75 | 72.5 |
| 7 | A | 1.0 | 0.031 | 85 | 82.5 | 82.5 | 82.5 |
| 8 | B | 1.0 | 0.020 | 82.5 | 82.5 | 82.5 | 82.5 |
| 9 | C | 1.0 | 0.015 | 80 | 80 | 80 | 80 |

The data show several trends. First, at the 0.25 gpt dose, Emulsion B (20% active according to the invention) performs better at the 30 second time interval than the 30% active prior art emulsion A. Second, when comparing equivalent active dose, Emulsion C (Run No. 6, 0.5 gpt, 0.0076 wt % Active Dose) performed better than prior art Emulsion A at the same Active Dose (Run No. 1, 0.25 gpt, 0.076 wt % Active Dose). Lastly, in all of these side by side tests, Emulsion B (according to the invention) provided comparable results to Emulsion A (prior art) at an Active dose that was two thirds of the active polymer dose according to the invention.

Thus, the water-in-oil polymer emulsion polymers according to the invention are able to provide comparable performance to the prior art water-in-oil polymer emulsion polymers at an active polymer dose that is from 15 wt % to 50 wt % lower than the prior art. When used to treat subterranean formations, the lower polymer dose decreases the risk of formation damage and/or flocculation in above ground fluid recycle operations such as terminal upsets.

Example 2

Three water-in-oil emulsion polymers were prepared as described in Example 1. Emulsion Sample D, 85/15 w/w acrylamide/acrylic acid copolymer, 30% active polymer, $\eta_{red}$ 0.05 dl/g of 27.5 dl/g (prior art); Emulsion Sample E, 77/23 w/w acrylamide/acrylic acid copolymer, 20% active polymer, $\eta_{red}$ 0.05 dl/g of 27.5 dl/g (according to the invention), and Emulsions Sample F, 77/23 w/w acrylamide/acrylic acid copolymer, 20% active polymer, $\eta_{red}$ 0.05 dl/g of 12.4 dl/g (according to the invention). Each of the samples were evaluated in the friction flow loop as described above. Results are shown in the table below.

| Run No. | Emulsion Sample | Dose (gpt) | Active Dose (wt. %) | 30 sec. | 1 min. | 2 min. | 3 min. |
|---|---|---|---|---|---|---|---|
| 1 | D | 0.25 | 0.0076 | 63 | 76 | 81 | 84 |
| 2 | E | 0.25 | 0.0051 | 87 | 84 | 84 | 81 |
| 3 | F | 0.25 | 0.0051 | 51 | 49 | 42 | 38 |
| 4 | D | 0.5 | 0.015 | 85 | 86 | 87 | 87 |
| 5 | E | 0.5 | 0.010 | 89 | 87 | 87 | 85 |
| 6 | F | 0.5 | 0.010 | 83 | 83 | 83 | 79 |

The data show several trends. First, at the 0.25 gpt dose, Emulsion E (20% active, higher reduced viscosity, according to the invention) performs better at the 30 second and 1 minute time interval than the 30% active prior art emulsion D. This result particularly demonstrates the ability of the present water-in-oil emulsion polymer to quickly make down and go into solution compared to the prior art. Second, when comparing equivalent active dose, Emulsion E performed equivalent or better than prior art Emulsion D across the board.

Thus, the water-in-oil polymer emulsion polymers according to the invention are able to provide comparable or better performance to the prior art water-in-oil polymer emulsion polymers at an active polymer dose that is from 15 wt % to 50 wt % lower than the prior art. When used to treat subterranean formations, the lower polymer dose decreases the risk of formation damage and/or flocculation in above ground fluid recycle operations such as terminal upsets.

The present invention has been described with reference to specific details of particular embodiments thereof. It is not intended that such details be regarded as limitations upon the scope of the invention except insofar as and to the extent that they are included in the accompanying claims.

What is claimed is:

1. A water-in-oil emulsion having an oil phase (O) and an aqueous phase (A) at an O/A ratio of from about 1:8 to about 10:1;
   wherein the water-in-oil emulsion includes the oil phase as a continuous phase comprising an inert hydrophobic liquid, and the aqueous phase as a dispersed phase of distinct particles in the oil phase comprising water and a water soluble polymer, and surfactants;
   wherein the water soluble polymer consists of 77% acrylamide and 23% acrylic acid and is present at 20 weight percent of the water-in-oil emulsion and
   wherein the water soluble polymer has a viscosity as determined in a Ubbelhhde Capillary Viscometer at 0.05% by weight concentration of the polymer in 1M NaCl solution, at 30° C., pH 7, of 27.5 dl/g.

2. The water-in-oil emulsion according to claim 1:
   wherein the water-in-oil emulsion comprises ammonium salt, 4-methoxyphenol, and an ethoxylated $C_{12}$-$C_{16}$ alcohol; and
   wherein the inert hydrophobic liquid comprises a mixture of paraffinic hydrocarbons and napthenic hydrocarbons; and
   wherein the surfactants comprise a tall oil fatty acid diethanol amine, a polyoxyethylene (5) sorbitan monooleate, and a sorbitan monooleate.

3. A method of treating a portion of a subterranean formation, comprising: Providing the water-in-oil emulsion according to claim 1; inverting the water-in-oil emulsion by adding it to water at from about 0.1 to about 2 gallons of water-in-oil emulsion per thousand gallons of water to form a friction reducing treatment solution containing from about 0.0025 to less than about 0.1% water soluble polymer based on the weight of the treatment solution; and introducing the treatment solution into the portion of the subterranean formation.

4. The method according to claim 3, wherein the friction reducing treatment solution is introduced into the portion of the subterranean formation at a rate and pressure sufficient to create or enhance one or more fractures in the portion of the subterranean formation.

5. The method according to claim 3, wherein the water-in-oil emulsion comprises at least one of an inhibitor, a salt, or an inverting surfactant.

6. The method according to claim 3, wherein the water-in-oil emulsion is present in the friction reducing treatment solution in an amount in the range of from about 0.1 to about 2 gallons of water-in-oil emulsion per thousand gallons of 2% KCl solution (gpt).

7. A water-in-oil emulsion having an oil phase (O) and an aqueous phase (A) at an O/A ratio of from about 1:8 to about 10:1;
   wherein the water-in-oil emulsion includes the oil phase as a continuous phase comprising an inert hydrophobic liquid, and the aqueous phase as a dispersed phase of distinct particles in the oil phase comprising water and a water soluble polymer, and surfactants;
   wherein the water soluble polymer consists of 77% acrylamide and 23% acrylic acid and is present at 20 weight percent of the water-in-oil emulsion;
   wherein the water soluble polymer is a polymer formed by polymerizing a monomer mixture comprising acrylic acid and acrylamide; and
   wherein the water soluble polymer has a viscosity as determined in a Ubbelhhde Capillary Viscometer at 0.05% by weight concentration of the polymer in 1M NaCl solution, at 30° C., pH 7, of 27.5 dl/g.

* * * * *